(12) United States Patent
Codonesu et al.

(10) Patent No.: US 10,065,675 B2
(45) Date of Patent: Sep. 4, 2018

(54) SYSTEMS AND METHODS FOR CORRECTING STEERING OFFSETS

(71) Applicant: FORD GLOBAL TECHNOLOGIES, LLC, Dearborn, MI (US)

(72) Inventors: Sergio Codonesu, Heerlen (NL); Oliver Nehls, Düsseldorf (DE); Lodewijk Wijffels, Canton, MI (US); Jitendra Shah, Kolkata (IN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 14/558,427

(22) Filed: Dec. 2, 2014

(65) Prior Publication Data

US 2016/0152265 A1    Jun. 2, 2016

(51) Int. Cl.
 *B62D 6/00* (2006.01)
 *B62D 15/02* (2006.01)

(52) U.S. Cl.
 CPC .................................. *B62D 6/002* (2013.01)

(58) Field of Classification Search
 CPC .... B62D 6/002; B62D 6/007; B62D 15/0235; B62D 15/0245; B62D 5/046; B62D 5/0469; B62D 5/008; B62D 6/008; B62D 15/02; B62D 15/021; B62D 15/024; B62G 2400/24; B62G 2400/44; B60W 2510/20; B60W 2510/205; B60W 2710/20; B60W 2710/205
 See application file for complete search history.

(56) References Cited

U.S. PATENT DOCUMENTS

| 6,349,998 B1 * | 2/2002 | Franke ................. B60T 8/1755 303/147 |
| 7,392,878 B2 | 7/2008 | Ono et al. |
| 8,428,822 B2 | 4/2013 | Shartle et al. |
| 8,515,622 B2 | 8/2013 | Shah et al. |
| 2006/0006020 A1 * | 1/2006 | Ono ....................... B62D 5/008 180/446 |
| 2010/0268420 A1 * | 10/2010 | Yasui .................. B60T 8/17555 701/41 |
| 2010/0280716 A1 * | 11/2010 | Shah ...................... B62D 5/008 701/42 |
| 2013/0041542 A1 * | 2/2013 | Kageyama .......... B60L 15/2036 701/22 |
| 2016/0001811 A1 * | 1/2016 | Endo .................... B62D 5/0466 701/41 |

FOREIGN PATENT DOCUMENTS

| DE | 10 2007 053 816 A1 | 5/2009 | |
| DE | 102007053816 A1 * | 5/2009 | ............ B62D 5/008 |
| DE | 10 2005 028 153 B4 | 8/2014 | |
| JP | 3901051 B2 | 4/2007 | |

* cited by examiner

*Primary Examiner* — Charles J Han
(74) *Attorney, Agent, or Firm* — Jones Robb, PLLC; Frank MacKenzie

(57) ABSTRACT

A system for correcting a steering offset generated by an active steering system of a vehicle may include a steering wheel angle sensor and a controller configured to receive a signal from the steering wheel angle sensor. The controller may be configured to determine a steering state based on the signal, and, subject to the determined steering state, calculate an offset reduction factor based on the signal to determine a new steering offset.

10 Claims, 4 Drawing Sheets

SYSTEMS AND METHODS FOR CORRECTING STEERING OFFSETS

CROSS REFERENCE TO RELATED APPLICATIONS

This application is related to German Application No. 102005028153, filed on Jun. 17, 2005, and German Application No. 102007053816, filed on Nov. 12, 2007, the entire content each of which is incorporated by reference herein.

TECHNICAL FIELD

The present disclosure relates generally to systems and methods for correcting steering offsets. In particular, the present disclosure relates to systems and methods for correcting steering offsets generated by an active steering system of a motor vehicle.

BACKGROUND

Active steering systems may continuously and intelligently alter the relationship between a driver's steering inputs at the steering wheel and the angle of the steered road wheels (i.e., the road wheel angle (RWA)) of the vehicle. An active steering system, for example, varies the degree that the road wheels turn in response to rotation of the steering wheel via a mechatronic auxiliary system. At lower speeds, this technology may reduce the amount that the steering wheel must be turned (improving performance in situations such as parking and other urban area traffic maneuvers), and at higher speeds, the system helps to prevent increased steering responsiveness resulting from increased speeds (providing improved direction stability).

Examples of active steering systems include, but are not limited to, a steer-by-wire system, in which there is no mechanical connection between the steering wheel and the steering of the road wheels, and a superimposed steering system, in which the steering angle that is generated at the steering wheel by the driver is superimposed on a steering angle generated by a servo motor, in a superimposition gear mechanism, and the sum of the two steering angles is transmitted to the steering of the road wheels. Such active steering systems provide various advantages, including, for example, the ability to change the angle of the steered road wheels without the intervention being directly perceptible to the driver.

At higher steering rates (e.g., when the driver of the vehicle is turning the steering wheel quickly), active steering systems may create a situation known as "steering catch-up," in which the power steering cannot provide sufficient assist and the driver feels an increased torque at the steering wheel. Active Front Steering (AFS) systems, for example, may provide an electronically controlled superposition angle (i.e., an overlay angle) to the steering wheel angle (SWA) provided by the driver to increase the SWA (and the effective steering speed), thereby creating a higher occurrence of steering catch-up situations.

To remedy this problem, AFS systems have been developed, which include steering anti-catch-up (SAC) features that may reduce steering catch-up and high current draws, for example, during slow speed driving (e.g., during parking and rolling when the driver is most likely to turn the steering wheel quickly). A SAC system may, for example, limit the rate of the desired pinion angle (i.e., the output of the AFS variable gear ratio (VGR) feature or the desired road wheel angle (RWA)) at particular vehicle speeds. In other words, to avoid catch-up when the driver steers quickly while driving slowly, the SAC may reduce the demanded road wheel turning speed by calculating an offset that will be applied to the desired RWA (i.e., the output of the VGR). Thus, as shown, for example, in FIGS. 3A and 3B, with the SAC, when the driver steers fast, the driver will get less overlay angle then he or she would get without the SAC, where the angle would be purely based on the VRG feature. When the fast steering event is over, the SAC will then attempt to smoothly reduce and remove this offset without the driver noticing.

Current SAC systems, which are generally dependent on steering speeds to determine offset calculation and correction, are therefore limited to offset reduction during periods of slow steering (i.e., when the system detects that the driver is steering at a slow rate via a steering wheel velocity sensor). Accordingly, as illustrated in FIG. 3A, such systems may, therefore, fail to remove offsets that are present, for example, when the driver is steering very slowly (i.e., at a speed that cannot be detected by looking at the steering wheel velocity signal), and when the steering wheel is back in the center position (e.g., at times $t_2$ and $t_4$ of FIG. 3A, wherein the desired RWA is zero).

It may, therefore, be advantageous for an active steering system to include a SAC feature that can correct steering offsets during all driving situations. It may be further advantageous to provide a SAC system that can completely remove the steering offset when the steering wheel is turned back to the center position so that the vehicle will drive straight ahead when the steering wheel is in the center position.

SUMMARY

In accordance with various exemplary embodiments, a system for correcting a steering offset generated by an active steering system of a vehicle may include a steering wheel angle sensor and a controller configured to receive a signal from the steering wheel angle sensor. The controller may be configured to determine a steering state based on the signal, and, subject to the determined steering state, calculate an offset reduction factor based on the signal to determine a new steering offset.

In accordance with various additional exemplary embodiments, a system for correcting a steering offset generated by an active steering system may include a vehicle comprising a pair of steered road wheels. The system may further include a controller configured to direct a change to an angle of the steered road wheels based on a determined steering state of the vehicle. The steering state may be chosen from one of a steering slowly state, a steering away from center state, and a steering toward center state.

In accordance with various further exemplary embodiments, a method for correcting a steering offset generated by an active steering system of a vehicle may include receiving a signal corresponding to a steering wheel angle of a steering wheel of the vehicle, and determining a steering state based on the received signal. The method may also include calculating an offset reduction factor if the determined steering state indicates that the vehicle is in a steering slowly state or a steering toward center state, and adjusting the steering offset based on the offset reduction factor and a desired road wheel angle requested by the active steering system. The method may further include changing an angle of the vehicle's steered road wheels based on the adjusted steering offset.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
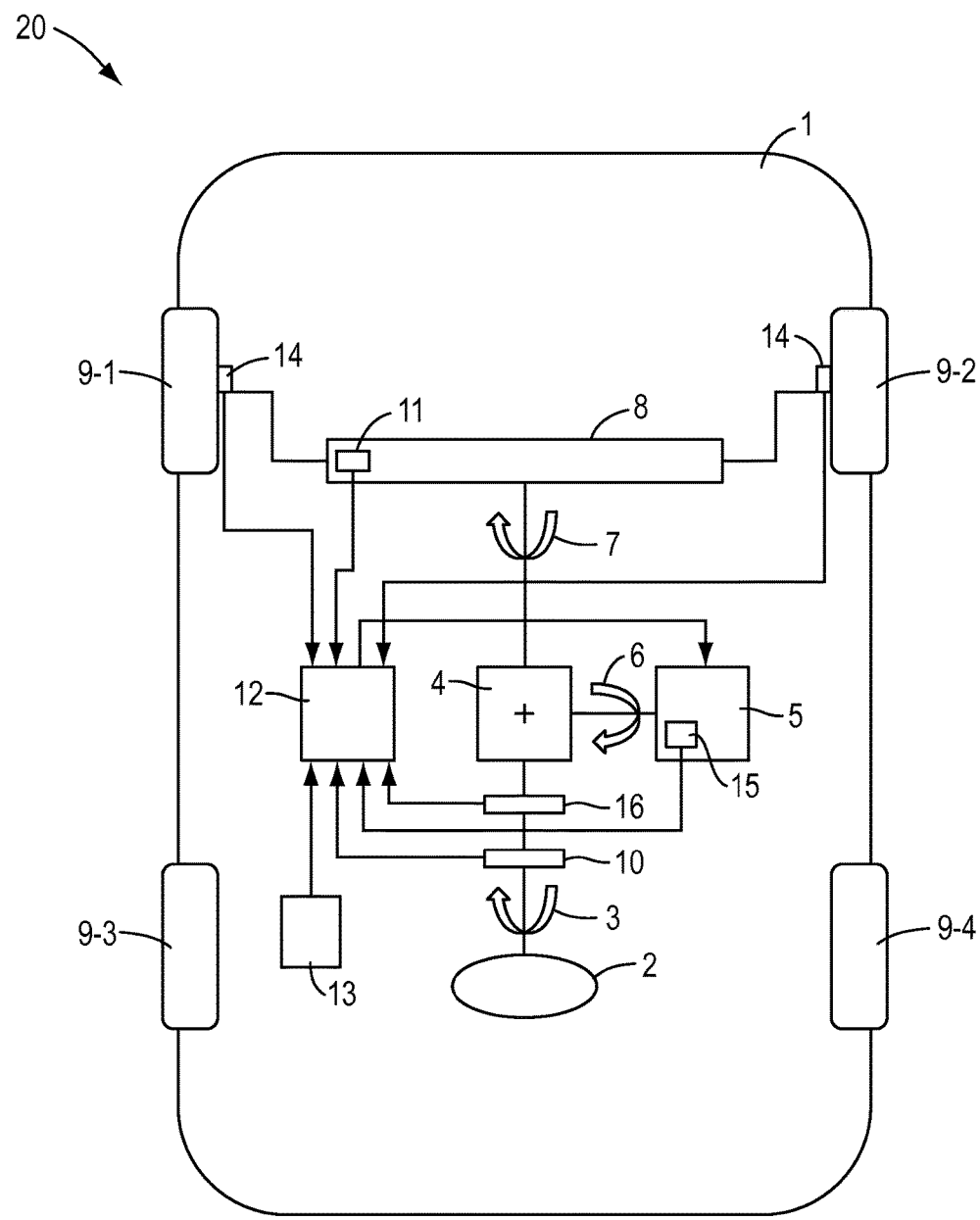
FIG. 1 is a schematic diagram showing the structure of an exemplary embodiment of a system for correcting steering offsets in a vehicle in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

An active steering system, such as, for example, Active Front Steering (AFS) provides an electronically controlled superposition of an angle to the steering wheel angle provided by the driver of the vehicle. When the driver is turning the steering wheel quickly, however, the AFS system may create a steering catch-up situation, in which the power steering is not able to provide sufficient assist, resulting in an increased torque that is felt by the driver at the steering wheel. AFS systems that include steering anti-catch-up (SAC) features, as disclosed, for example, in German Patent No. DE 102005028153 B4, filed Jun. 17, 2005, and German Patent Application Publication No. DE 102007053816 A1, filed Nov. 12, 2007, the entire contents of which are each incorporated by reference herein, have therefore been developed to help fix this problem. Notably, during certain vehicle speeds, SAC systems may calculate a steering offset that will be applied to the desired road wheel angle (RWA) requested by the AFS system.

To enable correction and removal of such offsets during all driving situations, including, for example, when the driver is steering very slowly and when the steering wheel is back in the center position, the systems and methods of the present disclosure contemplate determining a steering state of the vehicle, and, subject to the determined steering state, calculating an offset reduction factor. During certain driving situations, such as those identified above, the offset reduction factor will be applied to the SAC to reduce the chance the driver will experience an undesirable torque at the steering wheel.

In accordance with various embodiments, for example, determining a steering state of the vehicle may include selecting the steering state from one of the following: a steering slowly state, a steering away from center state, and a steering toward center state. The offset reduction factor is calculated, for example, when the determined steering state is either the steering toward center state or the steering slowly state. During such selected states, the offset reduction factor may be calculated, for example, based on a desired road wheel angle (RWA) that is requested by the AFS system (i.e., from the VGR function) and a steering offset that is generated by the AFS system (i.e., via the SAC system). The offset reduction factor may then be applied, for example, to the next desired RWA that is requested by the AFS system to generate a new (i.e., corrected) steering offset.

As used herein, the "steering state" refers to the relative position and direction of movement of the steering wheel at a particular point in time (i.e., the steering situation created by the driver of the vehicle at a given point in time). As above, in various embodiments, the steering state is chosen from one of three different states that indicate how the driver of the vehicle is presently directing/controlling rotation (or movement) of the steering wheel. As used herein, the "steering slowly state" refers to a state in which the driver is causing the steering wheel to rotate (e.g., turning the steering wheel) at a speed that is within the sensor noise region of the steering wheel velocity sensor. In other words, when in the steering slowly state, there is no discernable rotation of the steering wheel, either because the driver is not turning the steering wheel (i.e., the steering wheel is in its center position and the vehicle is driving straight ahead), or the driver is turning the steering wheel so slowly that the movement is undetectable by the steering wheel velocity sensor. As used herein, the "steering away from center" state refers to a state in which the driver is turning the steering wheel (i.e., to the left or right) at a detectable speed away from its center position, and the "steering toward center" state refers to a state in which the driver is turning the steering wheel (i.e., to the left or right) at a detectable speed toward its center position. As will be understood by those of ordinary skill in the art, these exemplary states are generally intended to encompass the different steering situations present during slow speed driving (e.g., during parking and rolling) when the driver is most likely to have turned the steering wheel quickly and activated the SAC system, which generates a steering offset that must be corrected. As will be further understood, however, these states are exemplary only and not intended to limit the scope of the present disclosure and claims.

Various exemplary embodiments of the present disclosure contemplate using various vehicle sensors to provide signals to a controller, and the controller then utilizes the signals to both determine the steering state and to calculate the offset reduction factor. The vehicle sensors may include existing vehicle sensors when available, such as, for example, active steering sensors, such as, for example AFS sensor(s), antilock brake system (ABS) sensor(s), steering wheel angle sensors, steering wheel velocity sensors, wheel speed sensors, vehicle speed sensors, and an actuator angle sensor, a pinion angle sensor, or any combination thereof. Because most existing vehicles already contain the above sensors, certain embodiments of the present disclosure contemplate using only existing vehicle sensors. Embodiments of the present disclosure also contemplate systems and methods that include and utilize additional sensors as needed to provide the signal inputs used in the systems and methods of the present disclosure.

To determine the steering state, the present disclosure contemplates determining a road wheel velocity (RWV) based, for example, on a signal received from a steering wheel angle sensor associated with the steering wheel of the vehicle, and comparing the determined RWV to a threshold RWV. The threshold RWV may be a lower limit of the RWV, such that if the determined RWV is below the threshold, the determined RWV may be within the sensor noise region of a steering wheel velocity sensor (i.e., within the steering slowly state). In other words, the threshold RWV represents the speed below which the motion of the steering wheel is no longer detectable by the steering wheel velocity sensor. Thus, if the determined RWV is less than the threshold RWV, the steering wheel is determined to be in the steering slowly state. And, if the determined RWV is above or equal to the threshold RWV, the steering wheel is determined to be in either the steering away from center state or the steering toward center state, based, for example, upon the sensed steering wheel angle. That is, if the determined RWV is above or equal to the threshold RWV, then the motion of the steering wheel is detectable by the steering wheel velocity sensor, and determined to be either moving away from the center or toward the center based on a comparison of the road wheel angle (RWA), which is determined based on the sensed steering wheel angle as described below, and the RWV. In accordance with various embodiments, for example, the steering wheel is determined to be in the steering away from center state, if the sign of the RWA is the same as the sign of the RWV; and the steering wheel is determined to be in the steering toward center state, if the sign of the RWA is different than the sign of the RWV.

Those of ordinary skill in the art will understand that the threshold RWV is, therefore, at least partially dependent on the quality of the steering wheel velocity sensor and the sensor noise region associated with the sensor. In various embodiments, for example, the threshold RWV is about 1.4 degrees/second.

In accordance with various embodiments, the RWV may be determined (i.e., for comparison with the threshold RWV) based on the RWA. The RWV may be determined, for example, by calculating the time derivative of the RWA. The RWV may be determined by various methods and using various inputs, including, for example, the steering wheel velocity multiplied by the overlay gain factor provided by the AFS multiplied by the steering gear ratio, or using the measured pinion angle multiplied by the steering gear ratio, as would be understood by those of ordinary skill in the art.

To calculate the offset reduction factor, for example, when the determined steering state is the steering slowly state or the steering toward center state, the present disclosure contemplates capturing the present desired RWA requested by the AFS system and the present steering offset generated by the AFS system (e.g., by the SAC feature), and dividing the captured steering offset by the captured desired RWA. In accordance with various embodiments of the disclosed systems and methods, a new (i.e., corrected) steering offset may then be calculated based on the offset reduction factor and the new desired RWA (i.e., the next desired RWA that is requested by the AFS system). As used herein, the term "desired road wheel angle" or "desired RWA" refers to the output of the AFS variable gear ratio (VGR) feature, or the desired pinion angle. In other words, the desired RWA is the sum of two steering angles (i.e., a steering angle that is generated at the steering wheel by the driver and an overlay angle that is generated by the AFS servo motor), which is transmitted by the AFS to the steering of the road wheels.

Accordingly the present disclosure contemplates estimating the desired RWA based on the steering wheel angle (SWA). The desired RWA may be estimated, for example, by adding the overlay angle generated by the AFS to the steering wheel angle that is generated by the driver. The RWA may be estimated, however, via various methods and using various inputs, including, for example, the pinion angle (via, e.g., a pinion angle sensor) multiplied by the steering ratio, as would be understood by those of ordinary skill in the art.

Turning now to the drawings, FIG. 1 shows the structure of an exemplary embodiment of a system 20 for correcting steering offsets in accordance with the present disclosure. A motor vehicle 1 includes an active steering system, such as, for example, an Active Front Steering (AFS) system (shown by individually labeled components). In use, a driver of the motor vehicle 1 may control the direction of motion of the motor vehicle 1 via a steering wheel 2, thereby deflecting (i.e., turning) the steering wheel 2 by an amount equal to a steering wheel angle 3. The AFS system, may include, for example, a superimposition gear mechanism 4, which superimposes a superimposition angle 6 (i.e., an overlay angle) on the steering wheel angle 3 via an actuator, such as, for example, an electric motor 5. A resulting compensated steering angle 7, which includes the steering wheel angle 3 and the superimposition angle 6, moves a steering gear 8, which moves two of the wheels 9-1, 9-2, 9-3, 9-4 into a desired position (i.e., the desired RWA). As shown in the embodiment of FIG. 1, in a vehicle having front axle steering, the compensated steering angle 7 will move the steering gear 8 to move the front wheels 9-1, 9-2 (i.e., the steered road wheels) of the vehicle 1.

In various embodiments of the present disclosure, the system 20 for correcting steering offsets may include one or more preexisting vehicle sensors embodied within various subsystems of the vehicle 1, and a controller 12 that is configured to receive signals from the sensors, determine a steering state based on the signals, and calculate an offset reduction factor based on the signals and the steering state. In various embodiments, for example, the active steering system includes a steering wheel angle sensor 10 that may detect the steering wheel angle 3 for determination of the desired RWA.

The system 20 may further include various additional sensors used to determine the desired RWA, the speed of the vehicle 1, and/or the speed of the steering wheel 2, including, for example, an actuator angle sensor 15 that may detect the superimposition angle 6, a pinion angle sensor 11, a vehicle speed sensor 13, wheel speed sensors 14 associated with each of the front wheels 9-1, 9-2 of the vehicle 1 and/or a steering wheel velocity sensor 16. Such sensors may be present in various additional subsystems of the vehicle 1, including, for example, the ABS system (not shown).

Those of ordinary skill in the art would understand that the system 20 for correcting steering offsets illustrated in FIG. 1 is exemplary only and intended to illustrate one embodiment of the present disclosure. Accordingly, systems and vehicles encompassing such systems in accordance with the present disclosure may have various types, numbers and/or configurations of actuators, controllers, and/or sensors without departing from the scope of the present disclosure and claims. For example, although the system 20 illustrated and described with reference to FIG. 1 includes an AFS system, embodiments of the present disclosure contemplate correcting steering offsets in conjunction with any type and/or configuration of active steering system.

As shown in FIG. 1, the controller 12 receives signals from at least the steering wheel angle sensor 10, and both determines a steering state of the steering wheel 2 and, subject to the determined steering state, calculates an offset reduction factor based on the signals, as set forth in the following exemplary embodiments. The controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art.

As above, to determine the steering state of the steering wheel 2, the controller 12 is configured to calculate a road wheel velocity (RWV) based on the steering wheel angle 3. The controller 12 may then compare the calculated RWV to a threshold RWV to determine the steering state. In various embodiments, based on this comparison, the controller 12 chooses between a steering slowly state, a steering away from center state, and a steering toward center state.

When the determined steering state is the steering away from center state (i.e., when the calculated RWV is greater than or equal to the threshold RWV and it is detected that the steering wheel is moving away from its center position), the controller 12 is configured to calculate a new steering offset, as disclosed in detail, for example, in German Patent No. DE 102005028153 B4 and German Patent Application Publication No. DE 102007053816 A1, the entire contents of which are incorporated by reference herein. For example, to calculate a steering offset, the controller 12 may be configured to compare a steering wheel velocity (SWV) (e.g., from the steering wheel velocity sensor 16) to a threshold SWV. In the same manner, when the determined steering state is the steering away from center state, the controller 12 may be configured to calculate a new steering offset by comparing the SWV to a threshold SWV, and adjusting the steering offset presently being applied by the SAC system based on the comparison. In various embodiments, for example, the controller 12 may be configured to increase the steering offset when the SWV is greater than or equal to the threshold SWV and to decrease the steering offset when the SWV is less than the threshold SWV.

The threshold SVW may be chosen, for example, to represent a speed above which the steering wheel is considered to be turning fast, thereby requiring an additional offset to compensate for the steering catch-up created by the AFS due to the fast steering. In accordance with various embodiments, for example, the threshold SVW may be about 400 degrees/sec.

When the determined steering state is the steering away from center state, to help ensure that a steering offset is only applied during situations that may create steering catch-up (i.e., when the driver steers quickly while driving slowly), various additional embodiments contemplate allowing the SAC to increase the steering offset (i.e., apply an additional steering offset) only during an established vehicle speed range (i.e., a SAC working range). In other words, to prevent the SAC system from increasing the steering offset when the driver is not driving slowly, the controller 12 may be configured to increase the steering offset only when a speed of the motor vehicle 1 is determined to be less than a threshold speed. In various embodiments, for example, the SAC working range may be a about 0 to about 20 kilometers per hour (kph), and the controller 12 may be configured to increase the steering offset only when the speed of the motor vehicle 1 is less than about 20 kph.

When the determined steering state is the steering toward center state (i.e., when the calculated RWV is greater than or equal to the threshold RWV and it is detected that the steering wheel is moving toward its center position) or the steering slowing state (i.e., when the calculated RWV is less than the threshold RWV), the controller 12 is configured to calculate an offset reduction factor to reduce and/or remove the current steering offset applied by the SAC (e.g., the steering offset that is applied when the determined steering state is the steering away from center state). In various embodiments, as discussed above, the controller 12 is configured to capture and store, for example, in a memory (not shown) associated with the controller 12, both the present desired RWA requested by the AFS system and the present steering offset generated by the AFS system (i.e., via the SAC), and calculate the offset reduction factor based on the captured values. As above, in accordance with various embodiments, the controller 12 may calculate the offset reduction factor by dividing the captured steering offset by the captured desired RWA (or by multiplying the captured steering offset by the captured RWA if the captured RWA is in fractional form). The controller 12 may then calculate a new (i.e., corrected) steering offset by multiplying the offset reduction factor by the new desired RWA (i.e., the next desired RWA that is requested by the AFS system). The new steering offset may then be applied to the desired RWA to change an angle of the vehicle's steered road wheels 9-1, 9-2.

To ensure that the steering offset is not increased, for example, if the desired RWA increases, in various exemplary embodiments, the controller 12 may be further configured to compare the new desired RWA to the captured RWA, and maintain the captured steering offset if the new desired RWA is greater than or equal to the captured desired RWA.

Figure 3A:
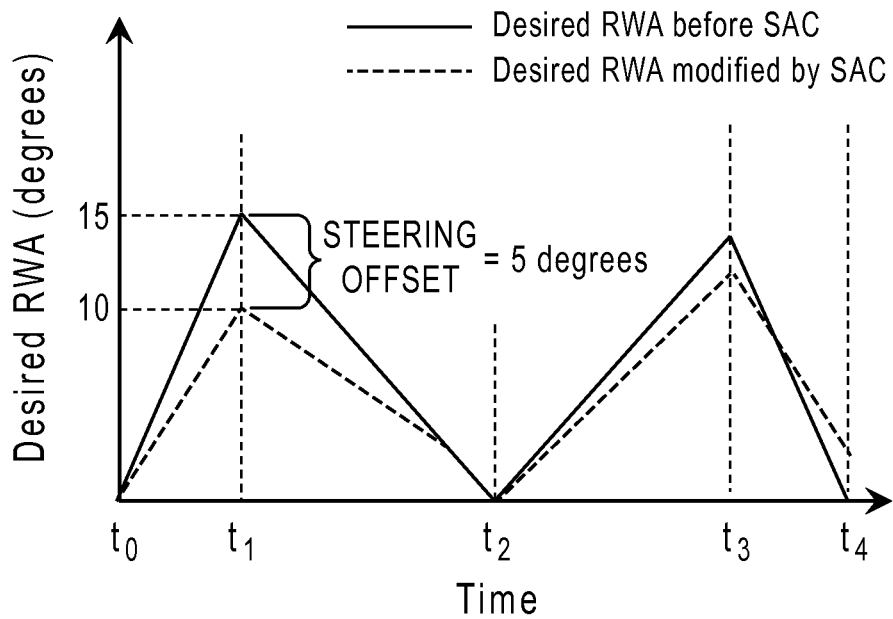
FIG. 3A is a schematic representation of a simulation run of an AFS system incorporating a conventional SAC system.
Figure 3B:
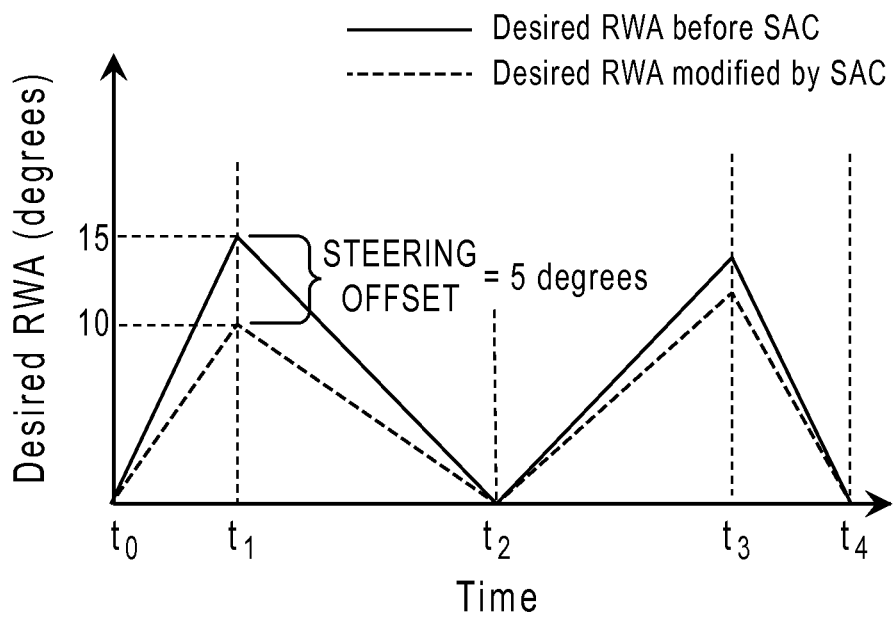
FIG. 3B is a schematic representation of a simulation run of an AFS system incorporating a SAC system in accordance with the present disclosure.

In this manner, as illustrated in FIG. 3B, systems in accordance with the present disclosure may effectively reduce and remove steering offsets even when the driver is steering very slowly (i.e., in the undetectable range of the steering wheel velocity sensor 16) and when the steering wheel is moving back toward and into the center position (e.g., at times $t_2$ and $t_4$ of FIG. 3B, wherein the desired RWA is zero degrees).

Figure 2A:
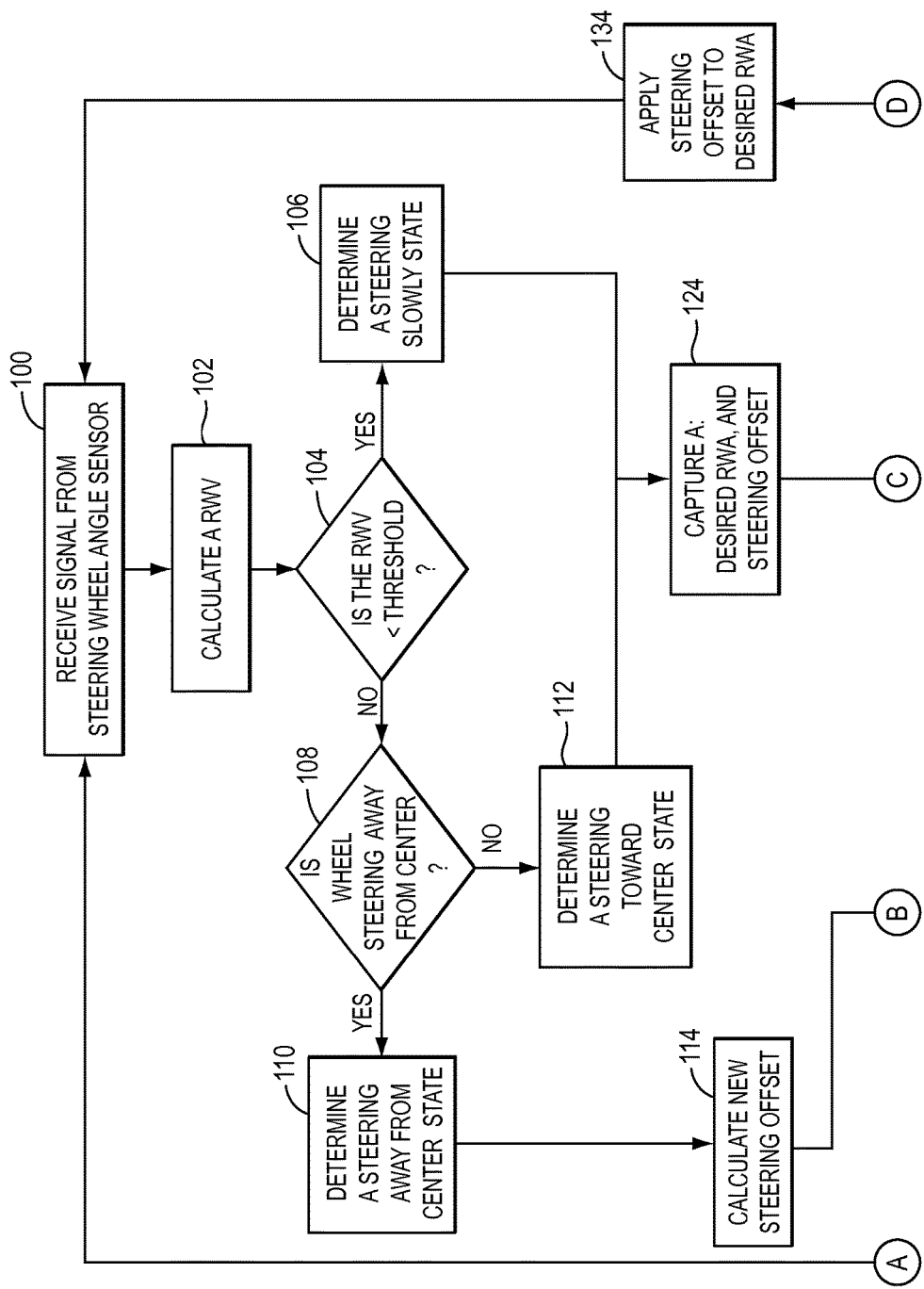
FIGS. 2A and 2B show a flow chart illustrating an exemplary embodiment of a method for correcting steering offsets in accordance with the present disclosure.
Figure 2B:
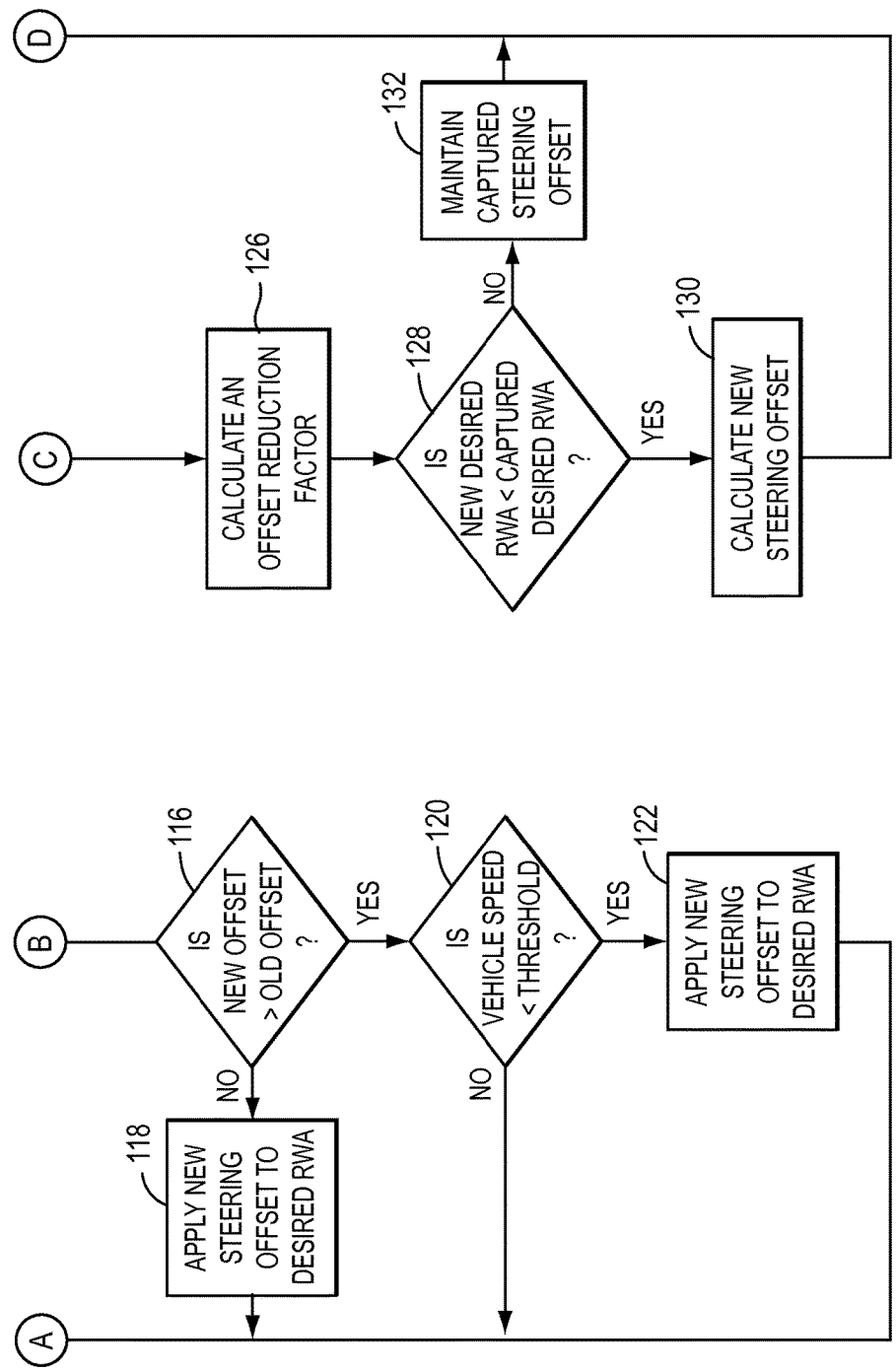

FIGS. 2A and 2B show a flow diagram depicting an exemplary embodiment of a method for correcting steering offsets in accordance with the present disclosure. The method begins, for example, when a vehicle, such as, for example, the vehicle 1 of FIG. 1, including the above described system 20, is started; and ends, for example, when the vehicle 1 is turned off. The method may be, for example, cyclical and constantly run as the vehicle is driven to continuously calculate and correct steering offsets (i.e., to compensate for steering catch-up).

As illustrated in FIGS. 2A and 2B, in various embodiments, for example, at step 100, a controller 12 may receive and store signals corresponding to various vehicle characteristics, including, but not limited to, a steering wheel angle 3 of the vehicle 1. The controller 12 may then determine a steering state based on the steering wheel angle 3. At step 102, for example, the controller 12 may calculate a road wheel velocity (RWV) based on the steering wheel angle 3, and, at steps 104-112, determine the steering state based on the calculated RWV. As above, in various embodiments, at step 104, the controller 12 may compare the calculated RWV to a threshold RWV (i.e., representing the speed below which the motion of the steering wheel is no longer detectable by a steering wheel velocity sensor). If the determined RWV is less than the threshold RWV, at step 106, the steering wheel 2 is determined to be in the steering slowly state. And, if the determined RWV is greater than or equal to the threshold RWV, at step 108, the steering wheel 2 is determined to be in either the steering away from center state or the steering toward center state, based, for example, upon the sensed steering wheel angle 3. For example, if the sign of the steering wheel angle 3 (or the RWA) is the same as the sign of the SWV (or the RWV), at step 110, the steering wheel 2 is determined to be in the steering away from center state; and if the sign of the steering wheel angle 3 (or the RWA) is different than the sign of the SWV (or the RWV), at step 112, the steering wheel 2 is determined to be in the steering toward center state.

If the determined steering state indicates that the vehicle 1 is in the steering away from center state, at step 114, the controller 12 may calculate a steering offset. As above, in various embodiments, for example, the controller 12 may calculate a new steering offset by adjusting (i.e., increasing or reducing) the present steering offset based, for example, on a steering wheel velocity (SWV) of the steering wheel 1. If the new steering offset is less than the old steering offset (i.e., if the steering offset was reduced), the controller 12 may then apply the new steering offset to the desired RWA, as illustrated in steps 116 and 118. To help ensure, however, that a steering offset is only applied during situations that may create steering catch-up (i.e., when the driver steers quickly while driving slowly), in various additional embodiments, at step 120, the controller 12 may confirm that the vehicle 1 is traveling within the working range of the SAC system prior to applying an increased steering offset. As illustrated in step 120, if a speed of the vehicle 1 is less than a threshold speed, at step 122, the controller 12 may apply the new increased steering offset to the desired road wheel angle (RWA) requested by the AFS. Thus, if the speed of the vehicle 1 is greater than or equal to the threshold speed, the steering offset may only be maintained or reduced.

If the determined steering state indicates that the vehicle 1 is in the steering slowly state or the steering toward center state, the controller 12 calculates an offset reduction factor. In various embodiments, for example, if the determined steering state indicates that the vehicle 1 is in the steering slowly state or the steering toward center state, at step 124, the controller 12 may capture and store the present desired RWA requested by the AFS and the present steering offset generated by the AFS. At step 126, the controller 12 may then calculate the offset reduction factor by dividing the captured steering offset by the captured RWA (or by multiplying the captured steering offset by the captured RWA if the captured RWA is in fractional form).

The controller may then adjust the steering offset based on the calculated offset reduction factor and the new desired RWA (i.e., the next desired RWA that is requested by the AFS system). At step 130, for example, the controller 12 may calculate a new (i.e., corrected) steering offset by multiplying the offset reduction factor by the new desired RWA (i.e., the next desired RWA that is requested by the AFS system). As above, to ensure, however, that the steering offset is not increased, for example, if the desired RWA increases, in various embodiments, as illustrated in step 128, the controller 12 may first compare the new desired RWA to the captured RWA, and, if the new desired RWA is greater than or equal to the captured desired RWA, instead maintain the captured steering offset as illustrated at step 132.

At step 134, the controller 12 may then apply the steering offset (either the new steering offset or the captured steering offset) to the next desired RWA requested by the AFS system to change an angle of the steered road wheels (e.g., the front wheels 9-1 and 9-2) of the vehicle 1.

As above, the controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art. The controller 12 is programmed to run an algorithm to correct steering offsets based, for example, on the flow chart of FIGS. 2A and 2B.

Furthermore, the method described above can be performed in one or more devices of the vehicle. For example, the method can be performed by a control device of an active steering system (e.g., an AFS system) such as a central control unit (not shown) or controller. The control device can be implemented within any element of the AFS system such as a control unit. Alternatively, the control device can be a separate device from any of the above-described AFS system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Accordingly, while the present disclosure has been disclosed in terms of using an AFS system, incorporating an SAC system, with a single controller, the disclosure as disclosed works equally well for various quantities and types of controllers and/or microprocessors. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present disclosure may be utilized independently, all as would be apparent to one skilled in the art after having the benefit of the description herein. Changes may be made in the elements described herein without departing from the spirit and scope of the present disclosure and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A system for correcting a steering offset generated by an active steering system of a vehicle, comprising:
    a steering wheel angle sensor; and
    a controller configured to receive a signal from the steering wheel angle sensor and determine, based on the signal, whether a steering wheel of the vehicle is in a steering slowly state, whether the steering wheel is in a steering away from center state, and whether the steering wheel is in a steering toward center state,
    wherein the controller is configured to calculate a road wheel steering velocity based on the signal and to determine, based on the calculated road wheel steering velocity, whether the steering wheel is in the steering slowly state, the steering away from center state, or the steering toward center state,
    wherein, when the steering wheel is determined to be in the steering slowly state, the controller is configured to calculate a first offset reduction factor based on the signal from the steering wheel angle sensor and change an angle of the vehicle's steered road wheels based on the first offset reduction factor.

2. The system of claim 1, wherein, to determine whether the steering wheel is in the steering slowly state, the steering away from center state, or the steering toward center state, the controller is configured to compare the calculated road wheel steering velocity to a threshold road wheel steering velocity.

3. The system of claim 2, wherein the threshold road wheel steering velocity is about 1.4 degrees/second.

4. The system of claim 1, wherein the controller is further configured to calculate a new steering offset based on the first offset reduction factor.

5. The system of claim 1, wherein, when the steering wheel is determined to be in the steering away from center state, the controller is configured to calculate a first new steering offset, and, when the steering wheel is determined to be in the steering toward center state, the controller is configured to calculate a second offset reduction factor.

6. The system of claim 5, wherein the controller is configured to store a current steering offset generated by the active steering system and a desired road wheel angle requested by the active steering system, wherein the calculation of the first offset reduction factor and the second offset reduction factor is based on the stored desired road wheel angle and the stored current steering offset.

7. The system of claim 6, wherein the controller is configured to calculate a second new steering offset based on the first offset reduction factor or the second offset reduction factor and a new desired road wheel angle requested by the active steering system.

8. The system of claim 7, wherein the controller is configured to maintain the stored current steering offset if the new desired road wheel angle is greater than or equal to the stored desired road wheel angle.

9. The system of claim 7, wherein the first new steering offset or the second new steering offset is used to change the angle of the vehicle's steered road wheels.

10. The system of claim 5, wherein the calculation of the first new steering offset includes comparing a steering wheel velocity to a threshold steering wheel velocity and adjusting a current steering offset generated by the active steering system based on the comparison.

* * * * *